US012776295B2

(12) United States Patent
Kang

(10) Patent No.: US 12,776,295 B2
(45) Date of Patent: Oct. 27, 2026

(54) PICK FOR PLAYING GUITAR

(71) Applicant: Hwanku Kang, Gwangju-si (KR)

(72) Inventor: Hwanku Kang, Gwangju-si (KR)

( * ) Notice: Subject to any disclaimer, the term of this patent is extended or adjusted under 35 U.S.C. 154(b) by 290 days.

(21) Appl. No.: 18/747,572

(22) Filed: Jun. 19, 2024

(65) Prior Publication Data

US 2024/0428756 A1 Dec. 26, 2024

(30) Foreign Application Priority Data

Jun. 20, 2023 (KR) ........................ 10-2023-0079341

(51) Int. Cl.
*G10D 3/173* (2020.01)

(52) U.S. Cl.
CPC .................................... *G10D 3/173* (2020.02)

(58) Field of Classification Search
CPC ............ G10D 3/173; G10D 1/08; G10D 1/00; G10D 3/00
See application file for complete search history.

(56) References Cited

U.S. PATENT DOCUMENTS 9,089,191 B1 * 7/2015 Farnum ................ A44C 9/0061
2015/0143973 A1 * 5/2015 Caccia ................... G10D 3/173 84/322

FOREIGN PATENT DOCUMENTS

KR 10-1376327 B1 3/2014
KR 10-2382878 B1 4/2022

* cited by examiner

*Primary Examiner* — Kimberly R Lockett
(74) *Attorney, Agent, or Firm* — Revolution IP, PLLC

(57) ABSTRACT

The pick for playing a guitar comprises a base formed entirely of a certain thickness and a finger insertion ring formed to protrude upwardly from the base. The finger insertion portion comprises a pillar portion and a cover portion. The pillar portion protrudes from a rearward side of the performance portion to an upper side of the base. The cover portion is formed extending from the thinnest part of the pillar portion.

7 Claims, 7 Drawing Sheets

PICK FOR PLAYING GUITAR

CROSS-REFERENCE TO RELATED APPLICATION

This application claims priority to and the benefit of Korean Patent Application No. 10-2023-0079341 filed in the Korean Intellectual Property Office on Jun. 20, 2023, the entire contents of which are incorporated herein by reference.

BACKGROUND OF THE INVENTION

1. Field of the Invention

The present invention relates to a pick for playing a guitar, and more specifically, to a pick for playing a guitar that can be easily fit on a finger, can be used continuously, stably and comfortably, and has a beautifully improved appearance.

2. Description of the Related Art

A pick for playing a guitar is a small piece that is played by plucking the guitar strings.

The pick is made of thin plate and is held with the thumb and index finger and played with a swing motion.

However, if the gripping force of the pick is weak, the pick may slip from the finger, or the pick must be held with excessive force to prevent the slipping, causing inconvenience in use.

In addition, in order to play properly, the pick must be held in the correct position. In particular, in the case of less skilled guitar players, the holding position of the pick changes each time the pick is held, which caused problems such as slow mastery or poor performance.

As a prior patent document 1 that improves the above-mentioned problems, there is a guitar pick with improved gripping feelings, registered patent number KR10-1376327 (registered on Mar. 13, 2014).

The guitar pick with improved gripping feelings of the prior patent document 1 includes a main body formed by gradually expanding in width from a contact portion through which a guitar string can be plucked, and a grip portion formed to be thicker than the main body while surrounding the main body on the opposite side of the contact portion of the main body.

The guitar pick with improved gripping feelings of prior patent document 1 configured as described above has an anti-slip function.

Therefore, the guitar strings can be plucked with less force than when gripped using the thumb and index finger, and the center of gravity sags toward the grip portion, which makes picking easier.

However, in the guitar pick with improved grip of prior patent document 1, the main body is made of a synthetic resin material, and the grip portion is made of a rubber material.

Accordingly, there is a problem in that it is not easy to manufacture because it is made of different materials, and the manufacturing cost increases.

As prior patent document 2, which improves the problems of prior patent document 1, there is a pick for playing a guitar of registered patent No. KR10-2382878 (registered on Mar. 31, 2022).

FIGS. 1 to 4 are diagrams showing the configuration of the pick for playing the guitar of the prior patent document 2.

Referring to FIGS. 1 to 4, the pick for playing the guitar 100 of prior patent document 2 comprises a performance portion 110 for directly plucking guitar strings, and a grip portion 120 formed on one side of the performance portion 110 for gripping with fingers.

At this time, the protrusion portion 101 is formed on the front and back sides respectively between the performance portion 110 and the grip portion 120 so that the thickness of the grip portion 120 is formed thicker relative to the performance portion 110.

And, as shown in FIGS. 1 and 2, a thumb positioning portion 121 is formed on the front side of the grip portion 120 for confirming a thumb gripping position so that gripping is performed with a thumb, and an index finger positioning portion 122 is formed on the back side of the grip portion 120 for confirming an index finger gripping position so that gripping is performed with an index finger.

Furthermore, as shown in FIG. 4, the thumb positioning portion 121 and the index finger positioning portion 122 are formed with an insertion groove dug to a certain depth according to the shape of the thumb and index finger so that the thumb and index finger can be inserted.

The depth and shape of the insertion groove is sufficient to ensure that the thumb or index finger does not slip after insertion, and the insertion groove is not limited to a specific dimension and shape.

And, the insertion grooves of the thumb positioning portion 121 and the index finger positioning portion 122 are formed orthogonally to each other. In other words, if the thumb positioning portion 121 is formed horizontally, the index finger positioning portion 122 is formed vertically.

Therefore, it is possible to grip the pick 100 naturally.

Furthermore, at least one side of the grip portion 120 is provided an insertion ring 130 into which a thumb or index finger can be inserted.

And, on the front side of the grip portion 120, the insertion ring 130 is formed for inserting the thumb.

However, this is only one embodiment, and it is of course possible to provide the grip portion 120 with the insertion ring 130 so that the index finger can also be inserted.

The insertion ring 130 may be substantially semicircular in shape, and the insertion ring 130, the grip portion 120 and the performance portion 110 may be manufactured as a unit by plastic injection molding from a single material.

And, as shown in FIG. 4, the insertion ring 130 is closed adjacent to the performance portion 110 and open on the other side, wherein a space of a certain height (h) is formed on the surface of the grip portion 120, and a rounded protrusion 131 is formed protruding in a round shape.

The pick for playing the guitar 100 of prior patent document 2, configured as described above, improves the grip feeling and prevents the pick 100 from slipping off the finger when playing the guitar, so that the pick 100 is always held in the correct position.

And, by making the performance portion 110, the grip position 120, and the insertion ring 130 integrated by plastic injection molding, the pick for playing the guitar 100 can be made of one material.

In addition, in the case of the insertion ring 130 of the pick for plying the guitar 100 in prior patent document 2, it is formed with a constant and thin thickness (about 1 mm), so it is very easy to insert the thumb into it due to elasticity.

However, since insertion ring 130 is formed with a constant thickness and thinness along its entire length, there is a problem that the thumb may not be able to be inserted, or may slip out on its own after insertion due to the different shapes and thicknesses of human fingers.

As a result, the user may feel uncomfortable while playing the guitar, may have difficulty playing consistently and steadily, or may have difficulty concentrating on playing the guitar.

In particular, if an overly thick thumb is forcibly inserted into the insertion ring 130, the insertion ring 130 may be stretched beyond its elasticity limit and break.

Furthermore, the rounded protrusion 131 is formed at the end of the insertion ring 130, which makes the molding process and injection molding of the pick 100 difficult, can cause damage by hitting other objects.

And, the pick 100 is structurally weak due to the protrusion portion 101 connecting the performance portion 110 and the grip portion 120.

Furthermore, the thumb positioning portion 121 is formed on the upper surface of the grip portion 120, which makes mold processing and injection molding difficult.

In particular, since the lower part of the rounded protrusion portion 131 is formed in a rounded shape, the inserted finger may slip out spontaneously.

SUMMARY OF THE INVENTION

An object of the present invention is to provide a pick for playing a guitar that can be easily inserted with a finger, can be played consistently and comfortably, and has an attractive appearance.

In order to achieve the above-mentioned object, a pick for playing a guitar of the present invention comprises a base formed entirely of a certain thickness and having a performance portion for plucking guitar strings formed on one side thereof, and a finger insertion ring formed to protrude upwardly from the base and formed to insert a finger for playing the guitar.

The finger insertion ring comprises a pillar portion and a cover portion.

The pillar portion protrudes from one rear side of the performance portion to the top of the base, and is formed integrally with the base, and a connection portion connected to the base is formed to be thickest, and decreases in thickness toward the top and is thinnest at the top.

The cover portion extends from the thinnest portion of the pillar portion, gradually increases in thickness to form the thickest part at the end, and covers the upper surface of the inserted finger.

And, the cover portion is formed such that an inlet space area of the finger insertion ring into which the finger is inserted is larger than an outlet space area of the finger insertion ring from which the finger is withdrawn, so that the inserted finger is fixed in the finger insertion ring at a certain position.

The finger insertion ring is formed as a whole at a predetermined angle inclined from the inlet to the outlet, and thus the inlet and the outlet have a difference in space area.

The finger insertion ring is formed by inclining a predetermined angle from the inlet toward the outlet, so that the underside of the finger insertion ring is visible from the front side of the inlet.

An end of the finger insertion ring is formed separate from the base, the end being opposed to an upper surface of the base.

The top of the finger insertion ring is provided with a decorative member extending from the top of the finger insertion ring.

The upper surface of the decorative member is formed flat, and an integral connection is formed between the decorative member and the finger insertion ring to integrally connect the decorative member and the finger insertion ring, the integral connection being formed in a round shape.

The decorative member is formed as a rectangular or circular shape.

Therefore, the pick according to the present invention can be easily inserted into the finger, can be used consistently and comfortably, and has a beautiful appearance.

DETAILED DESCRIPTION OF THE EMBODIMENTS

Hereinafter, a preferable embodiment according to the present invention will be described in detail with reference to the accompanying drawings.

Figure 1:
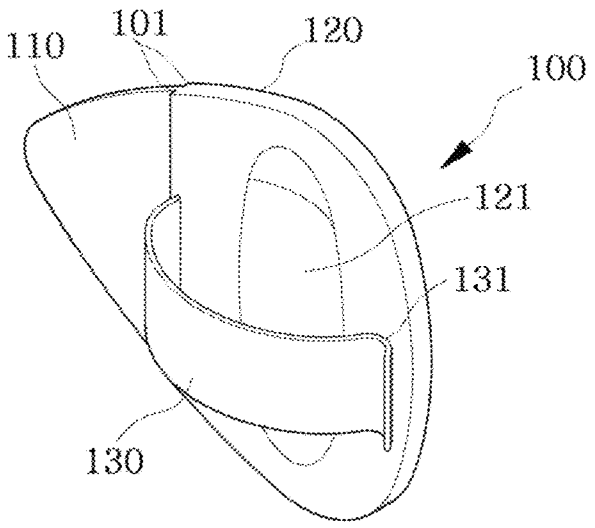
FIG. 1 Prior Art
FIG. 1 is a perspective view showing the external configuration of a guitar pick according to the prior art.
Figure 2:
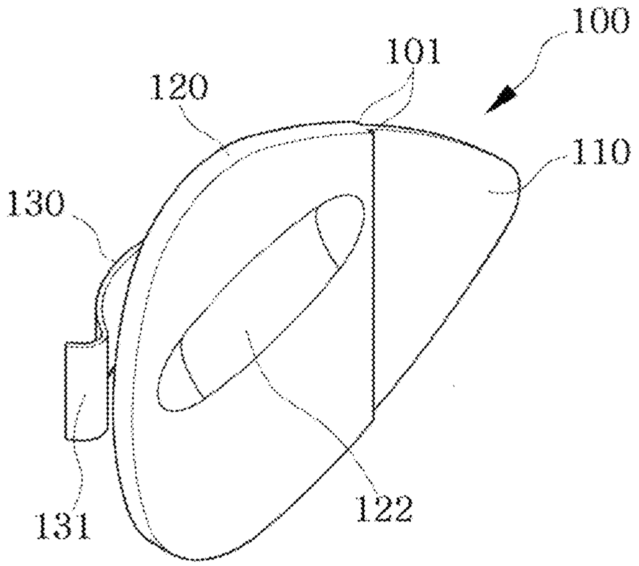
FIG. 2 Prior Art
FIG. 2 is a rear perspective view of FIG. 1.
Figure 3:
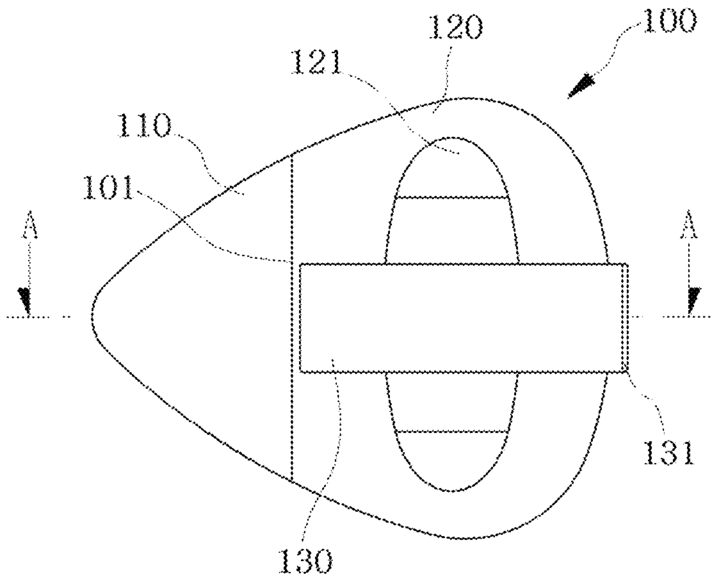
FIG. 3 Prior Art
FIG. 3 is a front view of FIG. 1.
Figure 4:
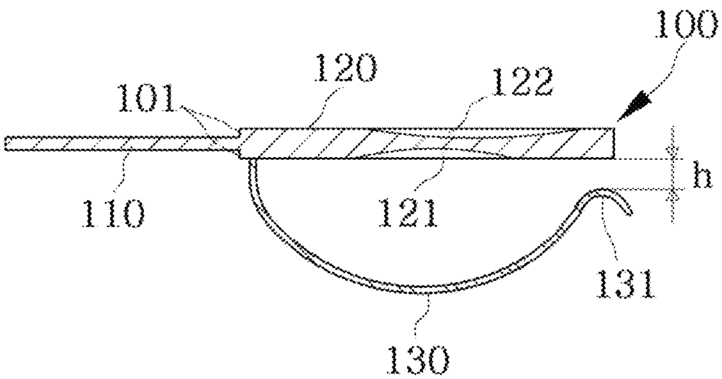
FIG. 4 Prior Art
FIG. 4 is a cross-sectional view taken along line A-A in FIG. 3.
Figure 5:
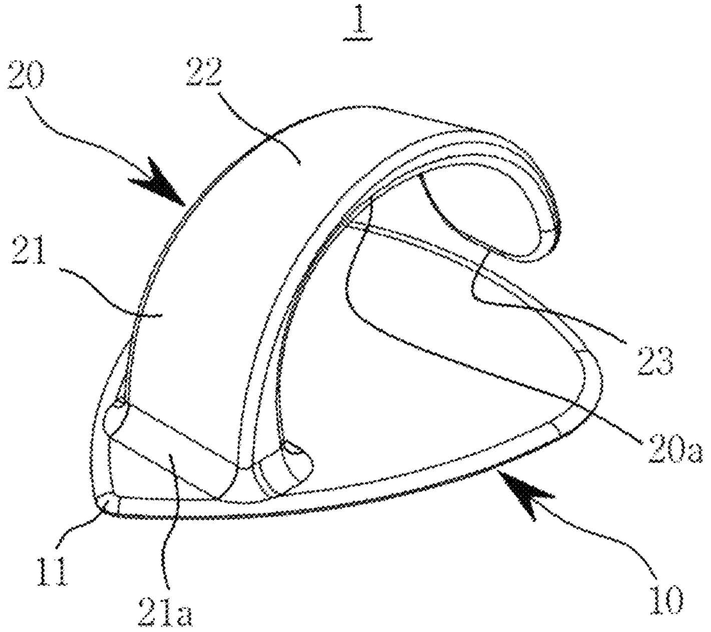
FIG. 5 is a perspective view of a pick for playing a guitar according to the first embodiment of the present invention.

FIG. 5 is a perspective view of a pick for playing a guitar according to the first embodiment of the present invention.

Figure 6:
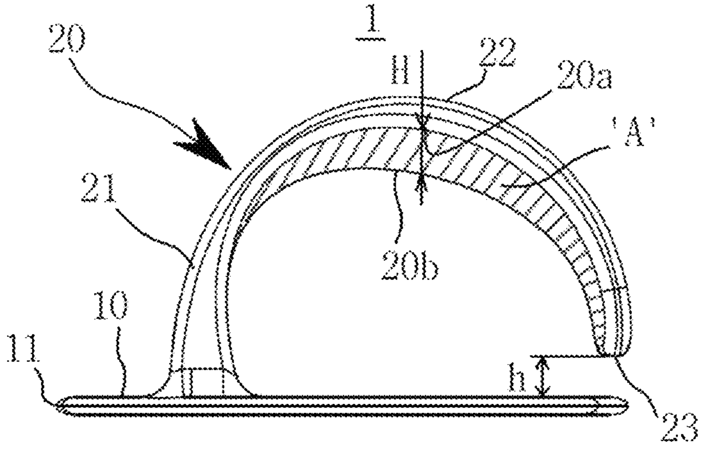
FIG. 6 is a front view of FIG. 5.
Figure 7:
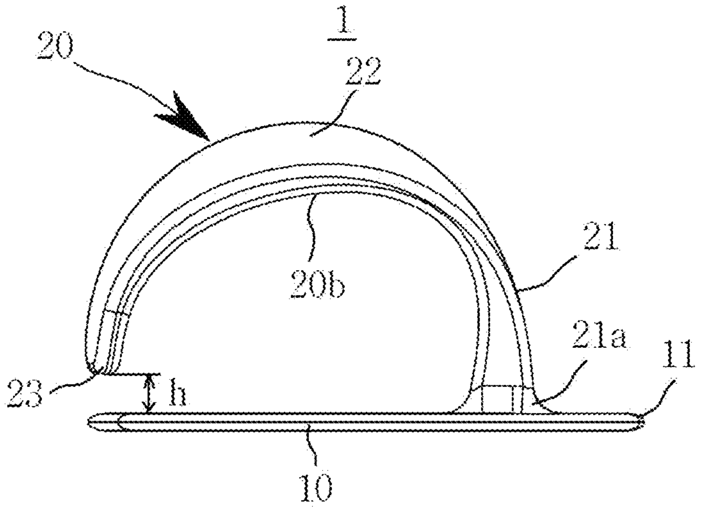
FIG. 7 is a rear view of FIG. 5.

FIG. 6 is a front view of FIG. 5 FIG. 7 is a rear view of FIG. 5.

Figure 8:
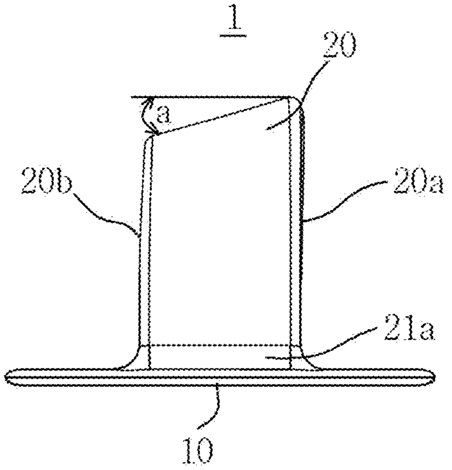
FIG. 8 is a left side view of FIG. 5.

FIG. 8 is a left side view of FIG. 5.

Figure 9:
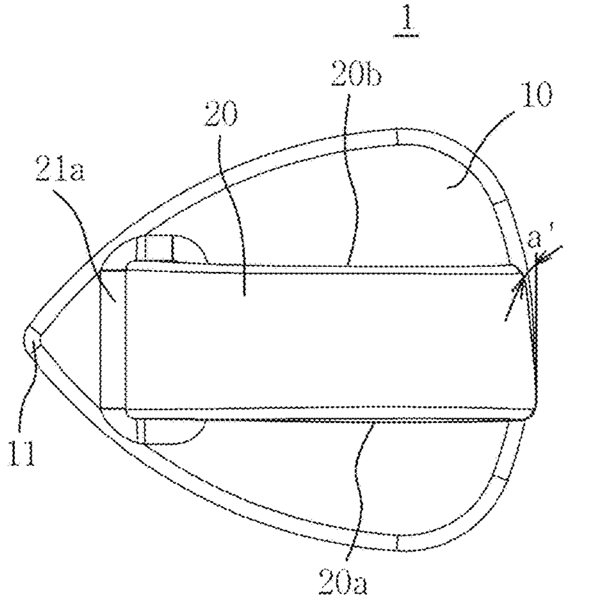
FIG. 9 is a plan view of FIG. 5.

FIG. 9 is a plan view of FIG. 5.

Figure 10:
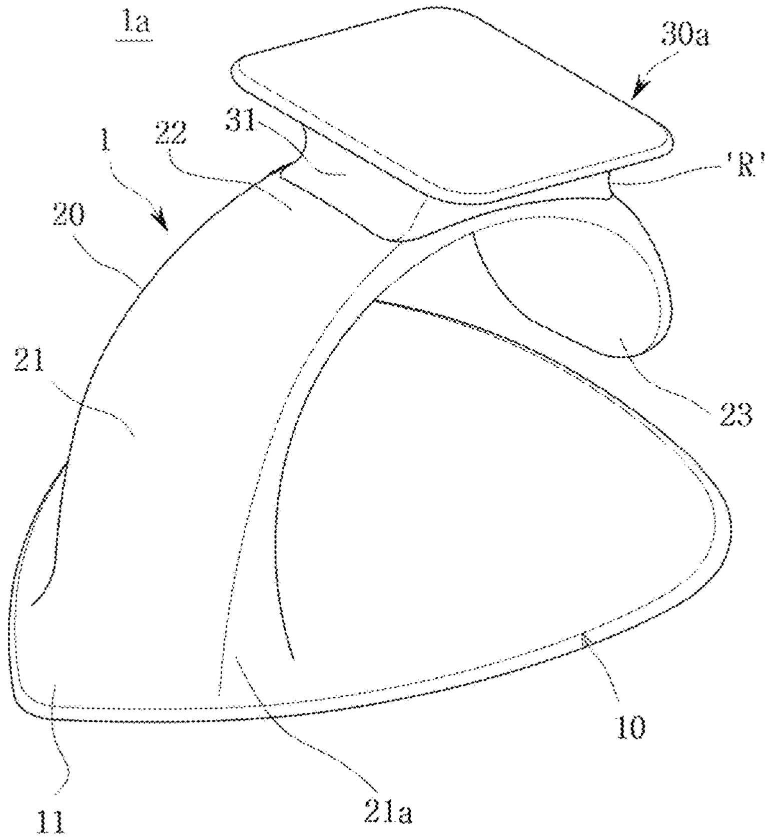
FIG. 10 is a perspective view of a pick for playing a guitar according to a second embodiment of the present invention.

Furthermore, FIG. 10 is a perspective view of a pick for playing a guitar according to a second embodiment of the present invention.

Figure 11:
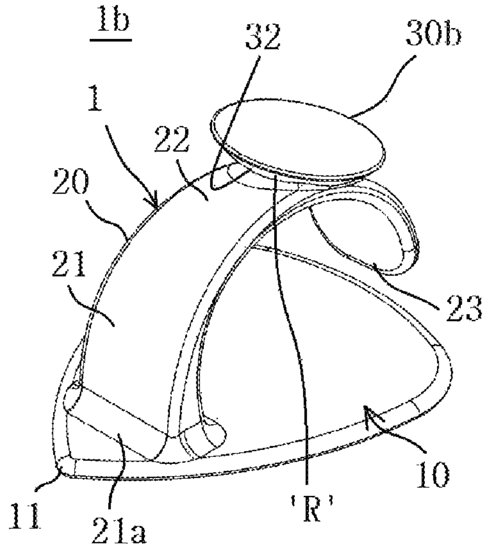
FIG. 11 is a perspective view of a pick for playing a guitar according to a third embodiment of the present invention.

And, FIG. 11 is a perspective view of a pick for playing a guitar according to a third embodiment of the present invention.

Firstly, referring to FIGS. 5 to 9, a pick for playing a guitar 1 according to the first embodiment of the invention comprises a base 10, which is formed of a certain overall thickness and has a performance portion 11 formed on one side for plucking guitar strings, and a finger insertion ring 20, which is formed to protrude from the top of the base 10 and is formed for inserting a finger for playing the guitar.

And, the finger insertion ring 20 includes a pillar portion 21 and a cover portion 22.

The pillar portion 21 protrudes from the rear one side of the performance portion 11 of the base 10 to the top of the base 10 and is formed integrally with the base 10, with a connection portion 21*a* connecting to the base 10 being formed thickest and decreasing in thickness toward the top, being formed thinnest at the top.

By being thickest at the connection portion 21*a*, the finger insertion ring 20 can be held firmly in place at the base 10, and by decreasing in thickness as it moves upwards, an elastic force is formed in the pillar portion 21 to facilitate the insertion of the finger.

Furthermore, the cover portion 22 is formed extending from the thinnest part of the pillar portion 21 (the topmost part of the pillar portion 21), and gradually increases in thickness again to form the thickest part at an end portion 23, covering the upper surface of the inserted finger.

The cover portion 22 also functions in the same way as the pillar portion 21 above.

And, as shown in FIGS. 6 and 7, and described later in FIG. 12, the space area of the finger insertion ring 20 at the inlet 20*a* where the finger is inserted is formed to be larger than the space area of the outlet 20*b* of the finger insertion ring 20 where the finger is withdrawn, so that the finger being inserted is easily inserted and the finger insertion ring 20 is fixed at a certain position of the inserted finger.

As shown in FIGS. 8 and 9, by forming the finger insertion ring 20 so that the finger insertion ring 20 as a whole is inclined at a predetermined angle (a, a') from the inlet 20*a* to the outlet 20*b*, a difference in the space area of the inlet 20*a* and outlet 20*b* (the area (A) of the portion shown by hatching lines in FIG. 6) is generated.

In other words, as shown in FIGS. 8 and 9, the finger insertion ring 20, and in particular the cover portion 22, is inclined at a predetermined angle (a, a') from the inlet 20*a* to the outlet 20*b* of the cover portion 22, so that the lower surface of the finger insertion ring 20 (the area (A) of the portion shown by hatching lines in FIG. 6) is visible from the front side of the inlet 20*a*.

Furthermore, it can be seen from FIG. 6 that the area (A) of the portion of the hatching lines is at a maximum height (H) at the center and gradually decreases in height as it moves to the left and right, reaching a minimum height at both the left and right ends of the cover portion 22.

The reason for this difference in area (A) is that the top of a human finger is formed almost flat, and for this reason the inlet 20*a* and outlet 20*b* of the cover portion 22 are formed as described above.

The end portion 23 of the finger insertion ring 20 is formed separated from the base 10 by a predetermined height (h), as shown in FIGS. 6 and 7, the end portion 23 being opposed to the upper surface of the base 10.

The finger is easier to insert into the finger insertion ring 20, and the inserted finger is less likely to slip out unintentionally.

Furthermore, as shown in FIGS. 10 and 11, the upper part of the finger insertion ring 20 of the guitar playing pick 1*a*, 1*b* according to the second and third embodiments of the invention is provided with decorative members 30*a*, 30*b* extending from the upper part of the finger insertion ring 20.

The upper surface of the decorative members 30*a*, 30*b* is formed flat, and each integral connection portion 31, 32 is formed between the decorative members 30*a*, 30*b* and the finger insertion ring 20 to integrally connect the decorative members 30*a*, 30*b* and the finger insertion ring 20, and the integral connection portion 31, 32 is formed in the shape of a round (R).

Furthermore, the decorative members 30*a*, 30*b* may be formed in a square or circular shape, for example in the form of a star or polygon.

Thus, the appearance of the picks 1*a*, 1*b* for guitar playing becomes more beautiful.

The width of the decorative members 30*a*, 30*b* may be formed wider than the width of the finger insertion ring 20.

Figure 12:
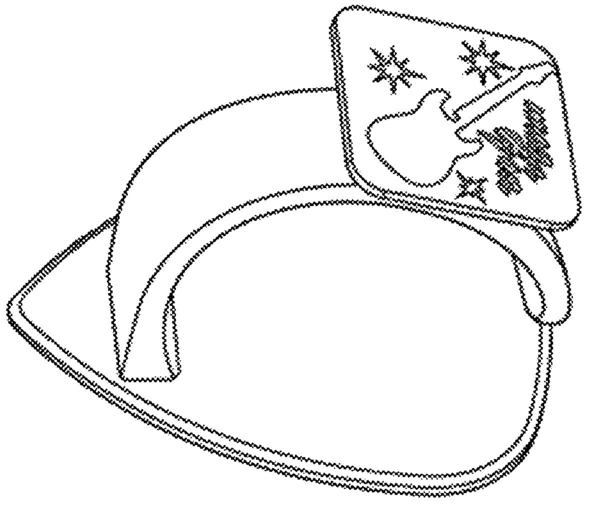
FIG. 12 is a photograph of a pick for playing a guitar according to the present invention equipped with a decorative member.

Therefore, as shown in FIG. 12, the decorative members 30*a*, 30*b*, which have a flat upper surface, can be decorated with a desired picture.

In this way, the pick for playing guitar 1*a*, 1*b* according to the present invention can be decorated with various desired characters or pictures on the decorative members 30*a*, 30*b*, so that the pick for playing guitar 1*a*, 1*b* can function as a ring and can also function as an accessory, making the appearance more beautiful.

Figure 13:
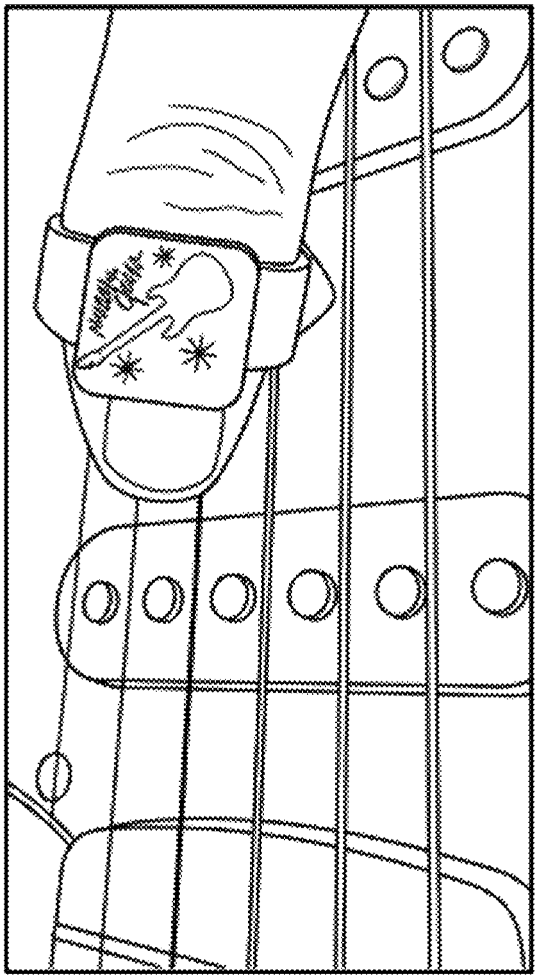
FIG. 13 is a photograph of playing a guitar with a pick for playing a guitar according to the present invention.

Furthermore, as shown in FIG. 13, the picks 1, 1*a*, 1*b* according to the present invention can be easily inserted into a finger, and once inserted into the finger, it does not slip out of the finger insertion ring unintentionally during guitar playing, and can be used continuously and comfortably.

While the present invention is described with reference to one embodiment illustrated in the drawings as described above, the embodiment is simply exemplary, and it is to be understood that various modifications and equivalent embodiments may be made from the embodiment by those skilled in the art.

Accordingly, the true protection scope of the present invention should be determined only by the appended claims.

The invention claimed is:

1. A pick for playing a guitar comprising:

a base formed entirely of a certain thickness, having a performance portion formed on one side thereof for plucking guitar strings; and a finger insertion ring formed to protrude upwardly from the base, formed to insert a finger for playing the guitar;

wherein the finger insertion portion comprises a pillar portion and a cover portion, wherein the pillar portion protrudes from a rearward side of the performance portion to an upper side of the base, and is formed integrally with the base, being thickest at the connection to the base, and decreasing in thickness toward the top, being thinnest at the top, wherein the cover portion is formed extending from the thinnest part of the pillar portion, increasing in thickness again to form the thickest part at the end, covering the upper surface of the inserted finger, and wherein the cover portion is formed such that the space area of the finger insertion ring at the inlet of the finger insertion is larger than the space area of the outlet of the finger exit, so that the finger is inserted and the finger insertion ring is fixed at a certain position of the inserted finger.

2. The pick for playing the guitar according to claim 1, wherein the finger insertion portion is formed as a whole with a predetermined angle of inclination from the inlet to the outlet, resulting in a difference in space area between the inlet and the outlet.

3. The pick for playing a guitar according to claim 2, wherein the finger insertion ring is formed to be inclined at a predetermined angle from the inlet to the outlet, so that the bottom of the finger insertion ring is visible from the front of the inlet.

4. The pick for playing a guitar according to claim 1, wherein an end portion of the finger insertion ring is separated from and formed with the base, and wherein the end portion is opposed to the upper surface of the base.

5. The pick for playing a guitar according to claim 1, wherein the upper portion of the finger insertion ring is provided with a decorative member extending from the upper portion of the finger insertion ring.

6. The pick for playing a guitar according to claim 5, wherein the upper surface of the decorative member is formed to be flat, and an integral connection portion is formed between the decorative member and the finger insertion ring to integrally connect the decorative member and the finger insertion ring, and wherein the integral connection portion is formed in a round shape.

7. The pick for playing a guitar according to claim 5, wherein the decorative member is formed in a square or circular shape.

* * * * *